United States Patent
Talgø

(10) Patent No.: US 11,213,969 B2
(45) Date of Patent: Jan. 4, 2022

(54) APPARATUS FOR HOLE-MAKING IN AN ELONGATED, TUBULAR BODY, AND METHOD OF USE OF THE APPARATUS

(71) Applicant: Talgø Teknologi AS, Sandnes (NO)

(72) Inventor: Tor Ole Talgø, Sandnes (NO)

(73) Assignee: Talgø Teknologi AS, Sandnes (NO)

( * ) Notice: Subject to any disclaimer, the term of this patent is extended or adjusted under 35 U.S.C. 154(b) by 126 days.

(21) Appl. No.: 16/617,239

(22) PCT Filed: May 29, 2018

(86) PCT No.: PCT/NO2018/050141
§ 371 (c)(1),
(2) Date: Nov. 26, 2019

(87) PCT Pub. No.: WO2018/222050
PCT Pub. Date: Dec. 6, 2018

(65) Prior Publication Data
US 2020/0147825 A1 May 14, 2020

(30) Foreign Application Priority Data

May 30, 2017 (NO) .................................. 20170884

(51) Int. Cl.
*B23B 47/28* (2006.01)
*B26F 1/34* (2006.01)
(Continued)

(52) U.S. Cl.
CPC ................ *B26F 1/34* (2013.01); *B21D 28/28* (2013.01); *B21D 28/34* (2013.01); *B23B 47/281* (2013.01); *B26D 7/08* (2013.01)

(58) Field of Classification Search
CPC ....... B21D 28/28; B23B 47/281; B23B 47/28; B23B 2215/72; B23B 2247/12; B23Q 9/02; B23Q 9/0042
See application file for complete search history.

(56) References Cited

U.S. PATENT DOCUMENTS

| 515,976 A | 3/1894 | Smith |
| 2,670,795 A | 3/1954 | John |
| (Continued) | | |

FOREIGN PATENT DOCUMENTS

| AU | 662288 | 8/1995 |
| DE | 305067 | 9/1919 |
| (Continued) | | |

OTHER PUBLICATIONS

Norwegian Search Report for NO 20170884, dated Nov. 27, 2017.
(Continued)

*Primary Examiner* — Alan Snyder
(74) *Attorney, Agent, or Firm* — Andrus Intellectual Property Law, LLP

(57) ABSTRACT

A hand-held apparatus is for hole-making in an elongated body. The apparatus has a housing including a rotatable cutting tool arranged to be axially movable from a non-cutting position into a cutting position. The first end portion of the housing comprises a clamping device arranged to be adjusted from a first, inactive position into a second, active position, wherein the clamping device, in the active position, is arranged to hold the apparatus fixed to the elongated body. The apparatus further has a device for connecting to a driving means, for example a hand-held drill.

13 Claims, 6 Drawing Sheets

(51) Int. Cl.
  *B21D 28/28* (2006.01)
  *B21D 28/34* (2006.01)
  *B26D 7/08* (2006.01)

(56) References Cited

U.S. PATENT DOCUMENTS

| | | | |
|---|---|---|---|
| 3,293,952 A * | 12/1966 | Fairbanks | F16L 41/002 |
| | | | 408/1 R |
| 4,514,116 A | 4/1985 | Kaminsky | |
| 4,902,174 A | 2/1990 | Thompson et al. | |
| 5,078,558 A | 1/1992 | Arai et al. | |
| 5,249,344 A | 10/1993 | Mcguire | |
| 5,893,686 A | 4/1999 | Weiler | |
| 6,128,991 A | 10/2000 | Nakagawa et al. | |
| 6,216,723 B1 | 4/2001 | King | |
| 6,640,827 B1 | 11/2003 | McClure | |
| 2003/0116967 A1 | 6/2003 | Kornau et al. | |
| 2006/0188349 A1 | 8/2006 | Weiler | |
| 2009/0145488 A1 | 6/2009 | Hoskisson et al. | |

FOREIGN PATENT DOCUMENTS

| | | |
|---|---|---|
| EP | 0205696 | 12/1986 |
| GB | 1263053 | 2/1972 |
| GB | 2185916 | 8/1987 |
| JP | 2001353541 | 12/2001 |
| WO | 8700776 | 2/1987 |
| WO | 9966243 | 12/1999 |
| WO | 2016134951 | 9/2016 |

OTHER PUBLICATIONS

International Search Report for PCT/NO2018/050141, dated Aug. 27, 2018.
The Written Opinion for PCT/NO2018/050141, dated Aug. 17, 2018.
Reply to the Written Opinion for PCT/NO2018/050141, dated Mar. 27, 2019.
The Written Opinion for PCT/NO2018/050141, dated Apr. 26, 2019.
International Preliminary Report on Patentability for PCT/NO2018/050141, dated Aug. 15, 2019.

* cited by examiner

APPARATUS FOR HOLE-MAKING IN AN ELONGATED, TUBULAR BODY, AND METHOD OF USE OF THE APPARATUS

CROSS-REFERENCE TO RELATED APPLICATIONS

This application is the U.S. national stage application of International Application PCT/NO2018/050141, filed May 29, 2018, which international application was published on Dec. 6, 2018, as International Publication WO 2018/222050 in the English language. The International Application claims priority of Norwegian Patent Application No. 20170884, filed May 30, 2017. The international application and Norwegian application are both incorporated herein by reference, in entirety.

The invention relates to a hand-held apparatus for hole-making in an elongated, tubular body, the apparatus comprising a housing, a rotatable cutting tool arranged to be moved from a non-cutting position to a cutting position, a clamping device arranged to hold the apparatus fixed to the elongated, tubular body and a device for connecting to a driving means.

BACKGROUND OF THE INVENTION

Tradespeople, for example plumbers, have the need to drill holes in radial surfaces, for example a water pipe in a building, to install a nozzle or a valve on the pipe. For pipes arranged to contain a fluid, it is particularly important that the hole to be drilled through the wall of the pipe is perpendicular to the centre axis of the pipe, so that the connection between the pipe and the valve will be tight.

The common practice is to drill the hole freehand by means of a hand-held drill with a hole-cutter bit including a centre dill. A pipe that is to have holes made in it in connection with a sprinkler system typically has an outer diameter of about 50 mm.

One challenge of the prior art is to avoid slippage of the centre drill on the surface of the pipe. The smaller the pipe diameter, the greater the risk of the drill slipping. Making a small recess in the pipe by means of a punch may reduce the risk of the drill slipping. However, this requires an extra operation. Then there is the challenge of drilling the hole in such a way that the axis of the hole is perpendicular to the centre axis of the pipe.

The problem of hole-making in pipes is described as particularly great when holes are to be drilled in fixedly installed pipes that are, for example, placed high on a wall or under a ceiling. In such cases, the operator must often hold a drill above his head and force the drill through the pipe wall. Often, the pipes are attached to the wall or the ceiling via suspension allowing a certain movement of the pipe. Such a movement complicates the drilling further.

The prior art describes various auxiliary tools for radial drilling. In the simplest form, an elongated holder including a longitudinal groove with two faces angled at 45 degrees to the surface may be used, the holder being laid against the outer side of the pipe and along the longitudinal axis of the pipe. The holder may comprise one or more guides with a diameter adapted to the diameter of the cutting tool. The holder normally has a low height, giving limited support for the cutting tool. The cutting tool is normally connected to a hand-held drill. Even if the holder gives a certain support for the cutting tool, a hand-held drill will entail the cutting tool exerting a radial pressure against the side of the guide, to a greater or smaller degree. Over time, the guide will become worn and inaccurate. The necessary push force on the cutting tool is achieved by the operator pressing on the drill. The holder may be held fixed to the pipe by hand power, a clamp or tongs.

For larger pipe dimensions, for example in the processing industry or the VA industry, it is known to use various tapping sleeves which are attached to a pipe by means of a surrounding clamp that is screwed to or welded to the pipe. Such tapping sleeves usually include special tools for driving the cutting tool through the pipe wall. A tapping sleeve with a surrounding fastening means usually includes several loose elements, for example bolts and nuts. Common to these tapping sleeves is that they are not adapted for hand-held drilling machines.

U.S. Pat. No. 6,128,991 discloses a device for hole-making in tubular parts, the device comprising a housing, an external punching tool and a support adapted for positioning inside the tubular part. The device further includes a clamping device arranged to hold the tubular part fixed to a block during the hole-making. The device is stationary.

The invention has for its object to remedy or reduce at least one of the drawbacks of the prior art or at least provide a useful alternative to the prior art.

The object is achieved through the features that are specified in the description below and in the claims that follow.

DESCRIPTION OF THE INVENTION

The invention is defined by the independent claim. The dependent claims define advantageous embodiments of the invention.

In a first aspect, the invention relates more specifically to a hand-held apparatus for hole-making in an elongated tubular body, the apparatus comprising a housing with a centre axis, a first end portion, a second end portion and a rotatable cutting tool arranged inside the housing and arranged to be moved axially from a non-cutting position to a cutting position, and the centre axis of the cutting tool and the centre axis of the housing being coaxial. The apparatus includes a clamping device arranged to be adjustable from a first, inactive position to a second, active position, the clamping device, in the active position, being arranged to hold the apparatus fixed to the elongated tubular body. The apparatus may further include a device for connecting to a driving means arranged to rotate the cutting tool. The housing may be a guide for the cutting tool.

By an elongated tubular body may be understood, in this connection, a pipe, for example a round pipe made of metal or plastic. By hand-held may be understood, in this connection, an apparatus which can easily be moved and operated with one or two hands by an operator.

The apparatus may include a centering device arranged to position the centre axis of the cutting tool perpendicularly to the centre axis of the elongated tubular body when the apparatus is attached to the elongated tubular body. The two axes form a plane which will be referred to, in what follows, as the horizontal plane of the housing. The centering device may be part of the housing. The centering device may be fixed or movable.

The centering device may comprise a radial recess, wherein the centre axis of the recess is perpendicular to the centre axis of the housing and coincides with the horizontal plane of the housing. The radius of the recess may be equal to the external radius of the elongated tubular body, in order thereby to give the elongated tubular body a stable lie against the housing. If the radius of the recess is larger than the radius of the elongated tubular body, the contact surface between the elongated tubular body and the recess will be smaller than when said two radii are equal.

The centering device may comprise at least two abutment faces placed symmetrically around the centre axis of the housing. The at least two abutment faces may be formed by the recess possibly comprising one or more portions having a larger radius than the end portions of the recess. An embodiment with separate abutment faces may provide a correct centering of an elongated tubular body with a radius that is different from the radius of the recess.

In an alternative embodiment, the centering device may include a V-shaped recess which forms two faces whose angle is symmetrical around the horizontal plane of the housing and the intersection line between the two faces is perpendicular to the centre axis of the housing and coincides with the horizontal plane of the housing. Such an embodiment may provide a correct centering of elongated tubular bodies of different radii.

The centering device may include a smooth surface or a fluted surface. A fluted surface may give better attachment between the apparatus and the elongated tubular body than a smooth surface and thereby reduce the risk of the apparatus slipping on the elongated tubular body.

The clamping device may be releasably attached to the first end portion of the housing, and the clamping device may include at least one movable and lockable gripper arm. The gripper arm is arranged to hold the elongated tubular body fixed to the housing, and the gripper arm may have a rotary motion or a linear motion or a combination of these motions. Advantageously, the gripper arm can move in a plane perpendicular to the horizontal plane of the housing and parallel to the centre axis of the housing.

To hold the elongated tubular body fixed to the housing, an embodiment with one gripper arm may advantageously comprise a gripper arm that grips around the elongated tubular body diametrically opposite the cutting tool and coincidingly with the centre axis of the cutting tool. An embodiment like that requires, in the position of application, that the elongated tubular body has a back clearance, for example towards a wall or a ceiling, which is larger than the thickness of the gripper arm.

The clamping device may comprise two movable and lockable gripper arms. The gripper arms may be placed symmetrically around the horizontal plane of the housing and they may be identical in design and geometry. The gripper arms may have a rotary motion or a linear motion or a combination of these motions. The gripper arms may advantageously move in a plane perpendicular to the horizontal plane of the housing and parallel to the centre axis of the housing. In an embodiment with two gripper arms, in which the gripper arms grip around the elongated tubular body from two sides, a sufficient grip may be achieved when the contact points of the two gripper arms with the elongated tubular body are above the centre line of the elongated tubular body. An apparatus with two gripper arms as described may, in a position of application, be attached to an elongated tubular body without a back clearance.

The gripper arm may be spring-loaded, by the gripper arm being connected to a spring which forces the arm outwards when the gripper arm is in an inactive position. An embodiment like that may simplify the use of the apparatus by enabling the apparatus to be positioned over the elongated tubular body without the operator actively having to open the gripper arm.

The clamping device may include a first actuator arranged to bring the gripper arm from an inactive position to an active position. The actuator may comprise prior-art means, for example a flip lock, a screw device or a hydraulic cylinder.

The first actuator may be a nut. The nut may surround the housing, and the housing may include an external threaded portion corresponding to the threaded portion of the nut. In such an embodiment, the gripper arm may comprise a first end portion and a second end portion, the two end portions being separated by a pivot axis, so that the gripper arm works as a lever. When the nut is rotated, the nut will press against the second end portion of the gripper arm, thereby giving the gripper arm a rotating motion so that the first end portion of the gripper arm is pressed against the elongated tubular body.

If the gripper arm is rotatable as described, with a rotational axis parallel to the centre axis of the elongated tubular body, the rotational axis of the gripper arm and the rotational axis of the nut will be perpendicular, so that multiaxial frictional forces are created between the nut and the gripper arm. Multiaxial frictional forces may entail the need for an extra torque on the nut to achieve sufficient clamping of the gripper arm to the elongated tubular body. Said frictional forces may be reduced by providing the nut with a thrust ring which is rotatably connected to the nut. When the nut is rotated and the thrust ring is pressing against the second end portion of the gripper arm, the thrust ring will have only an axial movement, thereby creating a uniaxial frictional force on the gripper arm. The frictional forces may be further reduced by providing the second end portion of the gripper arm with a sheave arranged to absorb the forces from the thrust ring.

The nut may further include a lever arm for giving the operator greater force when clamping the apparatus. The arm may be fixed or loose. A loose arm may, for example, be an open-end spanner or a screw driver.

The cutting tool may be rotatably connected to a second actuator for controllable, linear movement of the cutting tool from a first, non-cutting position to a second, cutting position. A controllable movement as described by the invention, makes it possible to stop the cutting operation as the cutting tool has passed the pipe wall, and thereby reduce the risk of the cutting tool continuing into the internal pipe wall on the opposite side when the resistance forces cease, as is the case in manual drilling.

The cutting tool may be directly connected to the second actuator or connected via an adapter. The cutting tool may be replaceable and the cutting tool may be a hole-cutter bit or a compact drill. The cutting tool and the adapter may include a magnet or a magnetic material for attracting metal chips and parts coming loose from the pipe wall, in order thereby to reduce the risk of said chips and parts ending up in the pipe.

The second actuator may be a screw adapted for finger operation. The external threaded portion of the second actuator may correspond to a second threaded portion inside the second end portion of the housing. The second actuator may include a centre cut-out extending therethrough, adapted for the passage of a driveshaft which connects the cutting tool to a driving means.

Externally, the second actuator may include a portion with a non-slip surface. The non-slip surface may be formed, for example, of milled fluting grooves or by the application of a friction coating.

The rotatable cutting tool may, in a non-cutting position, be at a distance from the elongated tubular body when the elongated tubular body is fixed in the clamping device.

Thereby, the cutting tool may rotate without being in contact with the elongated tubular body.

The apparatus may include a device for releasably attaching to a driving means. The device may include said driveshaft which, at its first end portion, is connected to the cutting tool and, at its second end portion, is connected to the driving means. The driving means may be a manual wheel or a manual wrench. The driving means may be a drill and the drill may be a hand-held one.

The attachment device may comprise a coupling and locking device adapted to a prior-art drill, and the attachment device may be adapted for attaching the drill without the use of a tool. The locking device may comprise both linear and radial locking of the drill.

METHOD OF USE OF THE APPARATUS

In a second aspect, the invention relates more specifically to a method of use of the hand-held apparatus for hole-making in an elongated tubular body, the method comprising:
- connecting a driving means to the apparatus;
- positioning the apparatus at an elongated, tubular body;
- clamping the apparatus to the elongated tubular body by bringing the clamping device from a non-active position into an active position;
- imparting rotation to the cutting tool by activating the driving means;
- moving the cutting tool from a non-active position to an active position by rotating the second actuator, and continuing the movement until the hole in the elongated tubular body has been drilled;
- releasing the apparatus from the elongated tubular body by deactivating the driving means and moving the cutting tool and the clamping tool to their inactive positions.

EXEMPLARY EMBODIMENT

In what follows, an example of a preferred embodiment is described, which is visualized in the accompanying drawings, in which.

The figures are shown in a simplified and schematic manner, and details that are not important for elucidating what is new in the invention have been omitted in the figures. The various elements in the figures are not necessarily shown to scale. Like and corresponding elements will be indicated by the same reference numbers in the figures.

Figure 1:
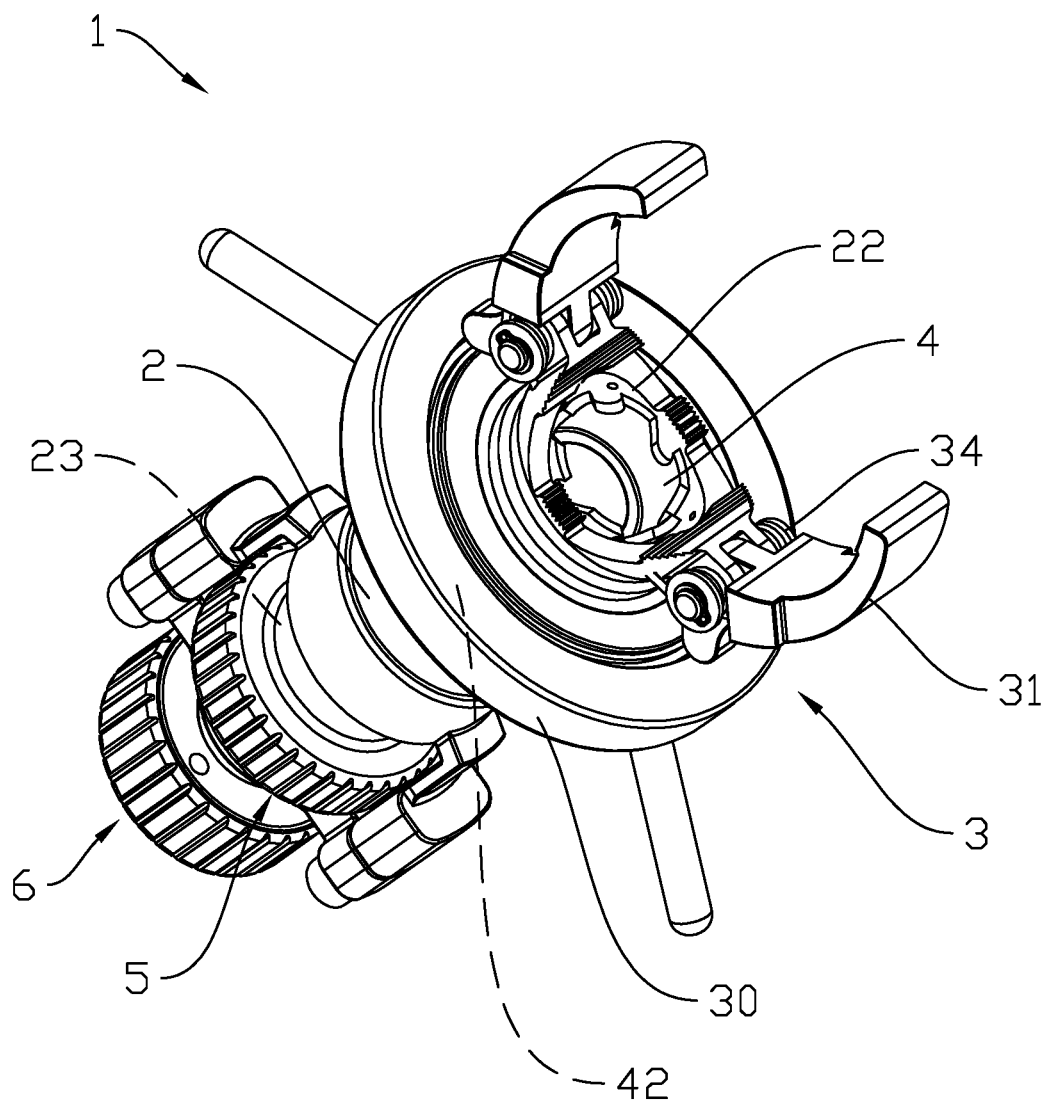
FIG. 1 shows a principle drawing in perspective of an apparatus according to the invention seen from the front in an inactive position.
Figure 2:
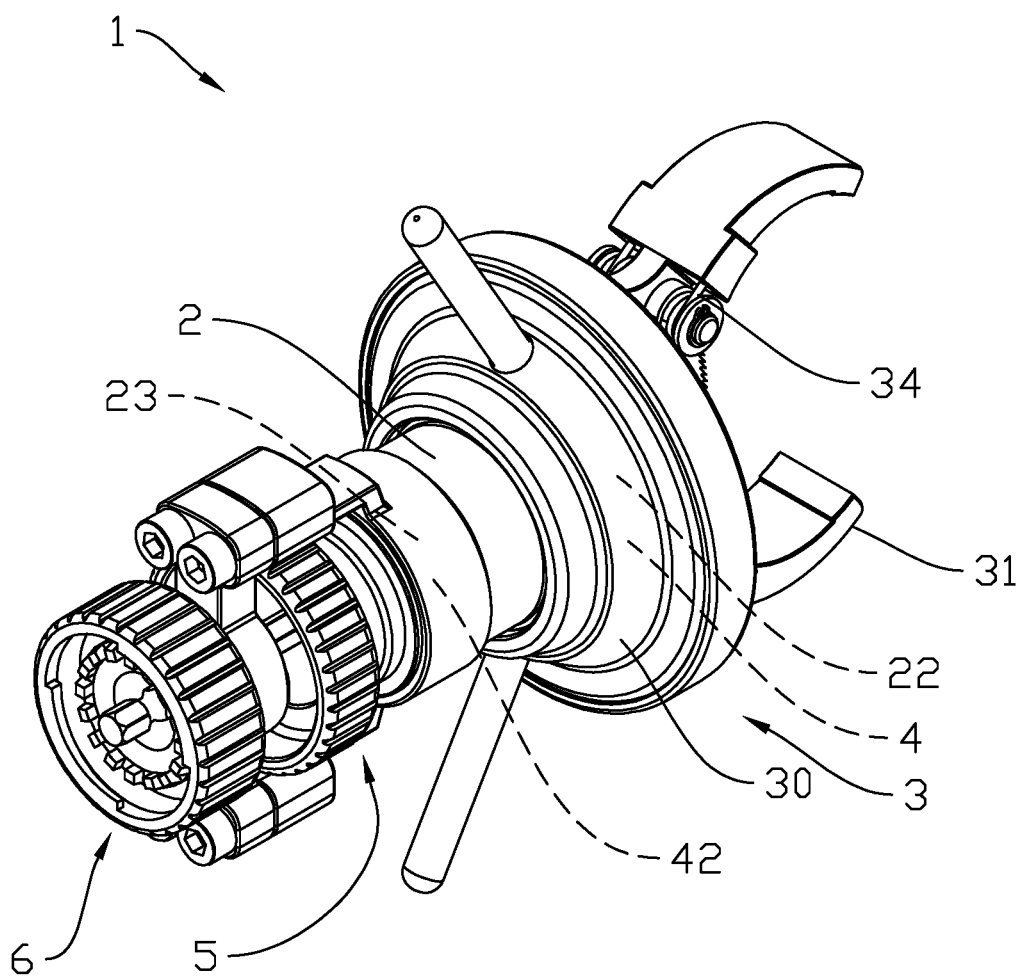
FIG. 2 shows a principle drawing in perspective of the apparatus seen from behind in the inactive position.
Figure 3:
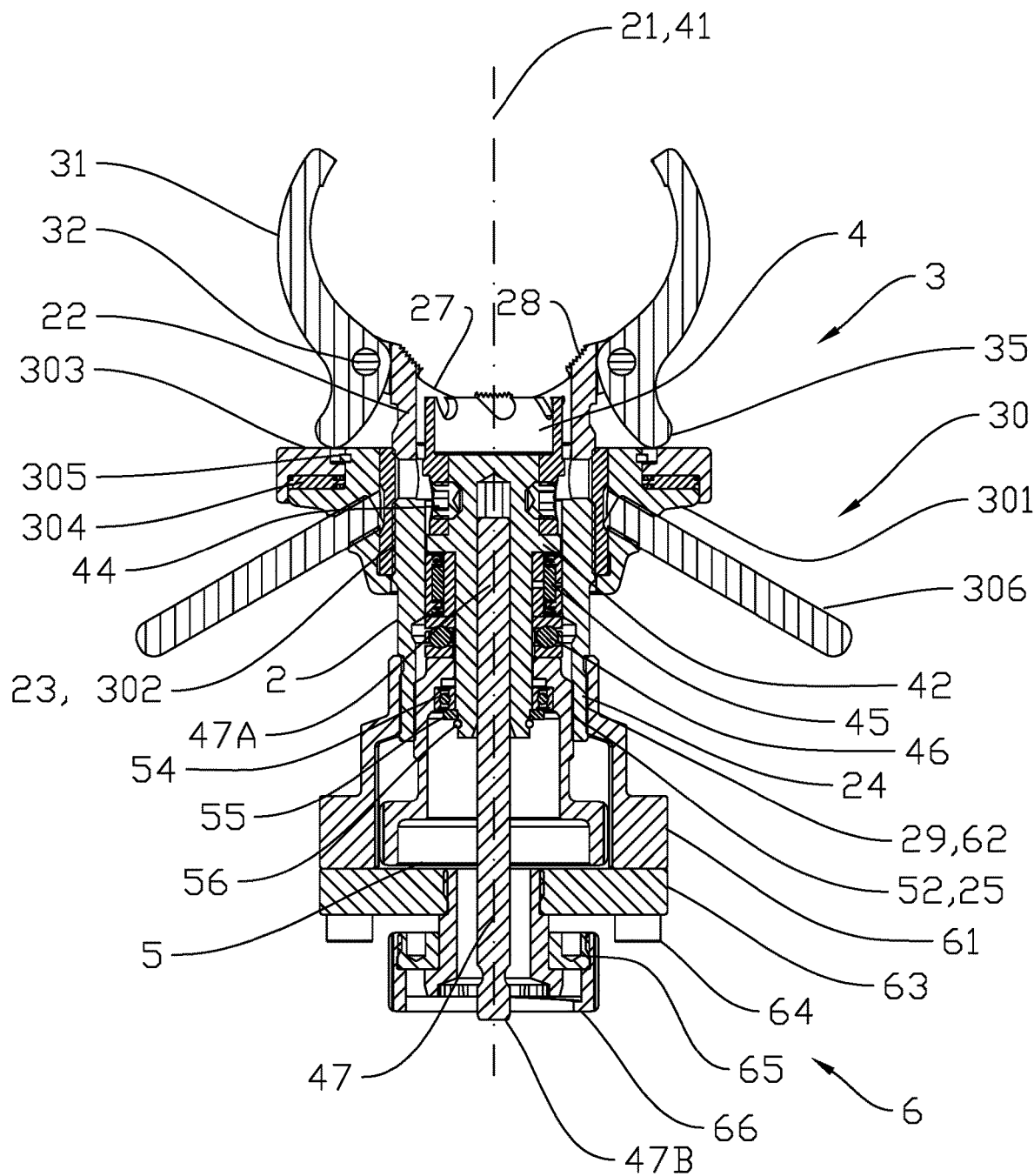
FIG. 3 shows a sectional drawing of the apparatus in the inactive position.

FIGS. 1-3 show an apparatus 1 for hole-making in an elongated tubular body 7 in a first, inactive position. FIGS. 1 and 2 show the apparatus in perspective, seen from the front and from the rear, respectively. FIG. 3 shows a sectional drawing of the apparatus 1.

Figure 4:
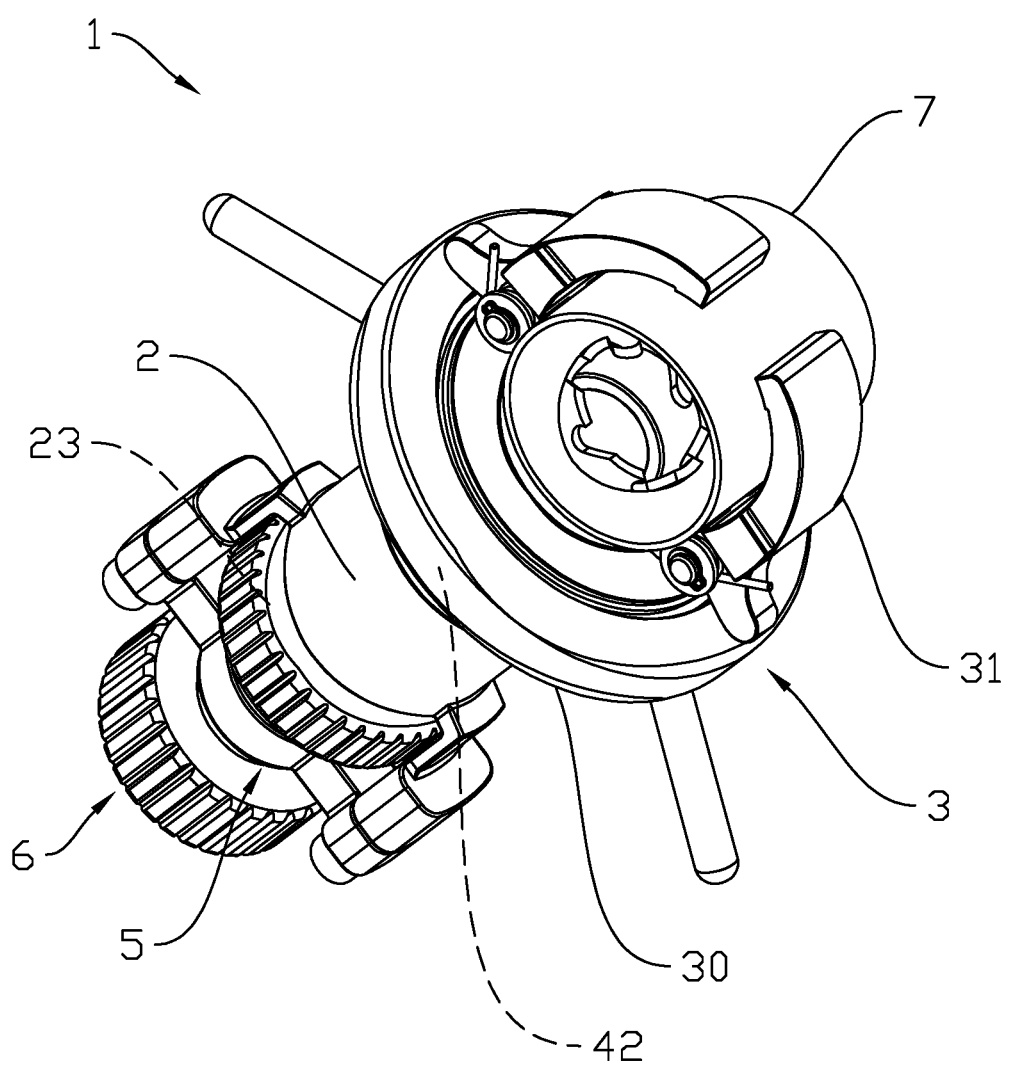
FIG. 4 shows a principle drawing in perspective of the apparatus seen from the front in an active position, attached to an elongated tubular body.
Figure 5:
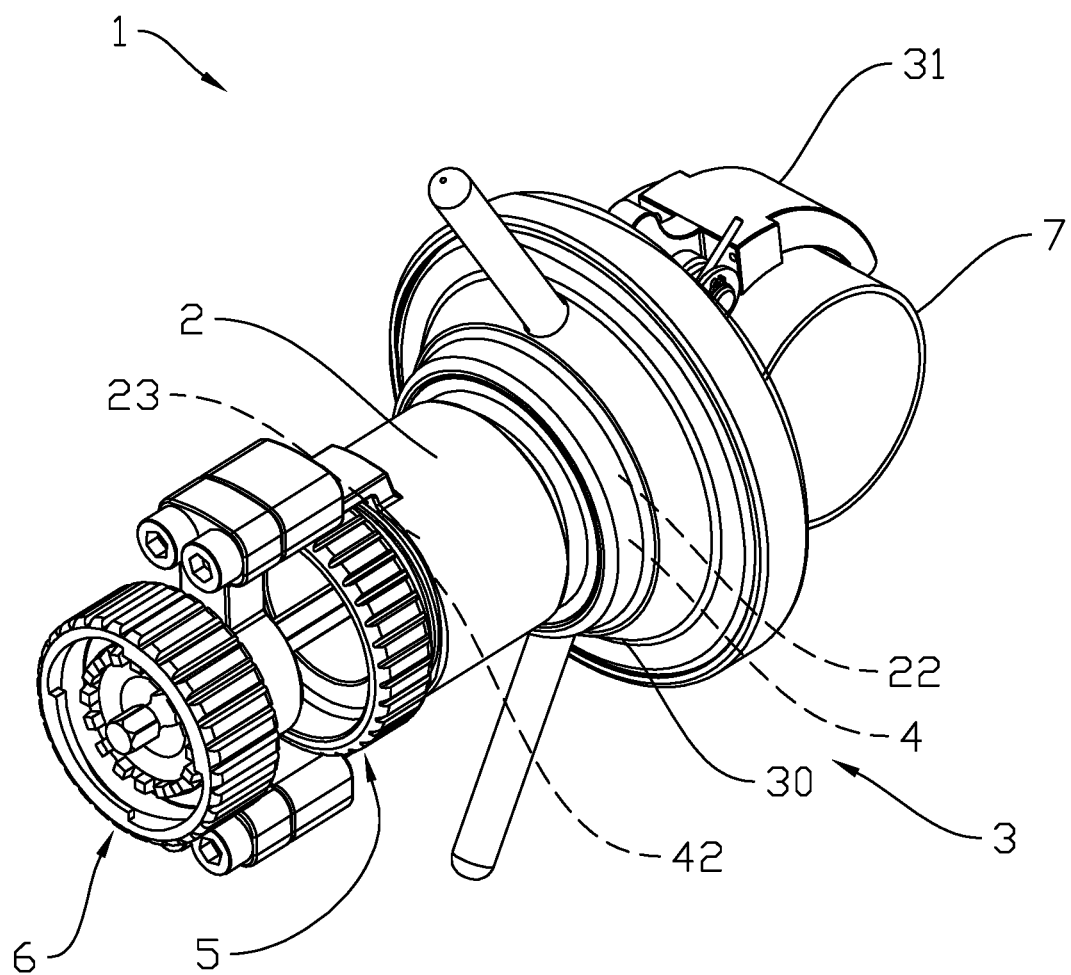
FIG. 5 shows a principle drawing in perspective of the apparatus seen from behind in the active position, attached to the elongated tubular body.
Figure 6:
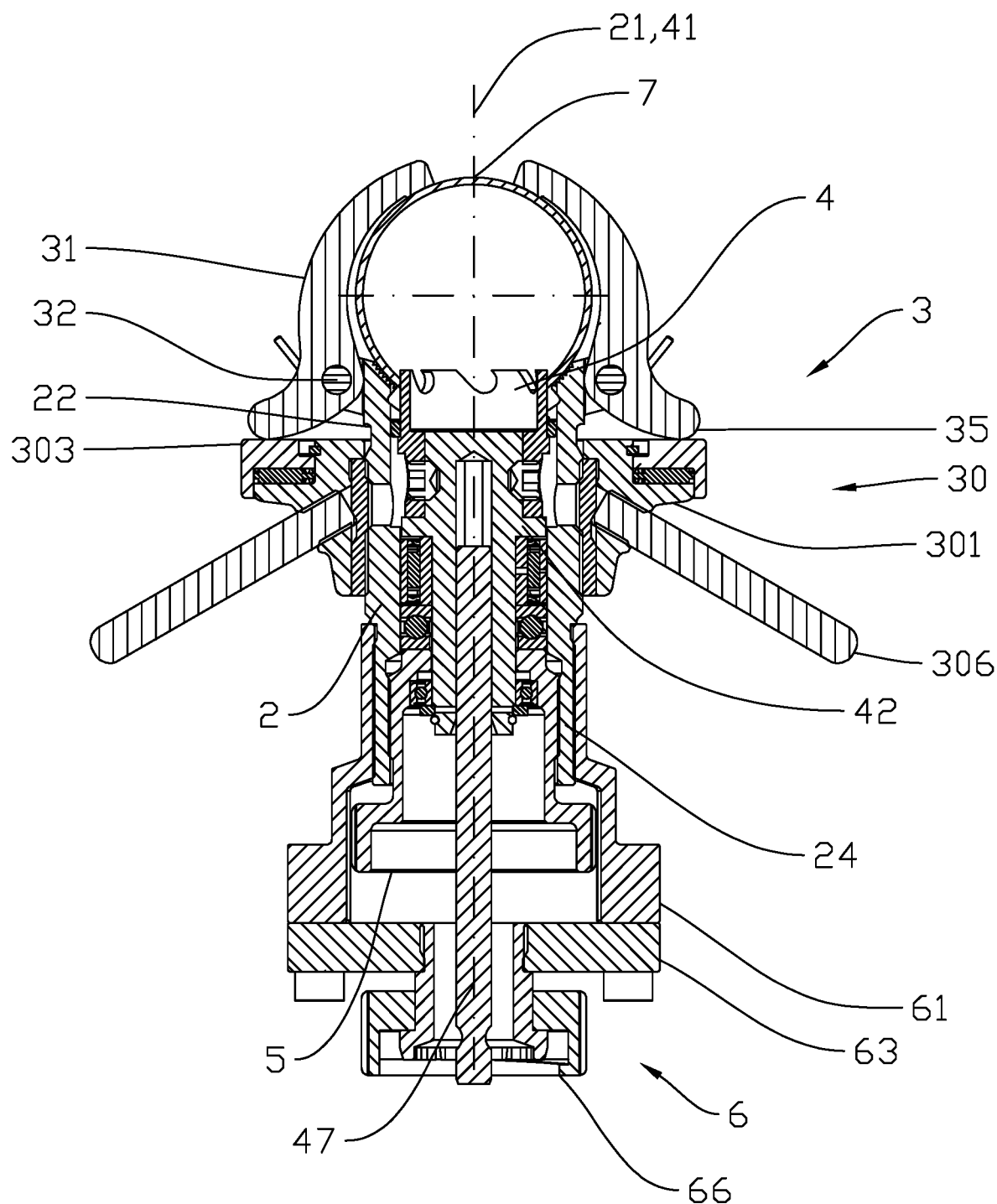
FIG. 6 shows a sectional drawing of the apparatus in the active position, attached to the elongated tubular body.

FIGS. 4-6 show the apparatus 1 in a second, active position attached to the elongated tubular body 7. FIGS. 4 and 5 show the apparatus in perspective, viewed from the front and from the rear, respectively. FIG. 6 shows a sectional drawing of the apparatus 1 attached to the elongated tubular body 7.

The apparatus 1 comprises a housing 2 with a first end portion 22 and a second end portion 23. Arranged inside the housing 2, there is a rotatable cutting tool 4 arranged to be movable axially from a non-cutting position, shown in FIGS. 1-3, into a cutting position shown in FIGS. 4-6. The centre axis 41 of the cutting tool 1 is coaxial with the centre axis 21 of the housing, as indicated in FIGS. 3 and 6.

The first end portion 22 of the housing 2 comprises a clamping device 3 arranged to be adjustable from the first, inactive position shown in FIGS. 1 and 3 to the second, active position shown in FIGS. 4-6. In the active position, the clamping device 3 is arranged to hold the apparatus 1 fixed to the elongated tubular body 7. The clamping device 3 comprises a linear first actuator 30 and two pivotable gripper arms 31.

The second end portion 23 of the housing 2 comprises a second actuator 5 arranged to move the cutting tool 4 axially from the non-cutting position as shown in FIGS. 1 and 3 into the cutting position shown in FIGS. 2 and 4. The second actuator 5 is connected to the cutting tool 4 via an adapter 42.

The second end portion 24 of the housing 2 further comprises an attachment device 6 for a hand-held drill (not shown).

In what follows, reference is made in particular to FIGS. 3 and 6, which show sectional drawings of the apparatus in the inactive position and the active position, respectively. For the sake of exposition, some of the references that are shown in FIG. 3 are omitted in FIG. 6.

In the first end portion 22 of the housing 2, a centering device is arranged, comprising a radial recess 27. The radial recess 27 comprises four raised abutment faces 28 with a fluted surface arranged to prevent the apparatus 1 from rotating radially around the elongated tubular body 7.

The gripper arms 31 are pivotably attached to the housing 2 via axles 32. The pivot axes of the gripper arms 31 are parallel to the centre axis of the elongated tubular body 7. Four springs 34 (see FIGS. 1 and 2) are arranged to force the gripper arms 31 apart so that the gripper arms 31 are automatically opened when the first actuator 30 is screwed in the direction of the second end portion 24 of the housing 2 to release the apparatus 1 from the elongated tubular body 7.

The first actuator 30 is provided with an internal threaded portion 302 which corresponds to an external threaded portion 23 of the housing 2. The first actuator 30 gives the gripper arms 32 a pivoting motion from the inactive position shown in FIG. 3 to the active position shown in FIG. 6, by the first actuator 30 being rotated around the centre axis 21 of the housing 2. The first actuator 30 comprises a thrust ring 303 and a thrust bearing 304. When the first actuator 30 rotates, the thrust bearing 304 will absorb the axial forces from the gripper arms 31, and the second end portions 35 of the gripper arms 31 will have a uniaxial motion against the thrust ring 303. The second end portion 35 of the gripper arm 31 is rounded to reduce the friction against the thrust ring 303. The first actuator 30 comprises two arms 306 arranged to provide a moment when the first actuator 30 is being rotated.

The cutting tool 4 is supported inside the housing 2 and releasably attached to an adapter 42 with two adjusting screws 44. Externally, the adapter 42 is supported on the housing 2 via a pin bearing 45, and the cutting tool 4 is supported on the housing 2 via a supporting ring 43.

The rotation of the cutting tool 4 is provided by a polygonal shaft 47 being releasably connected, in a first end portion 47A, to the adapter 42 via a corresponding cut-out in the adapter 42, and being releasably attached, in a second end portion 47B, to a driving means (not shown). The shaft 47 has a cross section adapted for connection to a prior-art hand-held drill (not shown).

The adapter 42 is rotatably attached to a second actuator 5. The second actuator 5 is a screw provided with an external threaded portion 52 corresponding to an internal threaded portion 25 in the housing 2. By turning the second actuator 5, the adapter 42 and the cutting tool 4 are given an axial movement. In the position of application, the shaft 47 is attached to the driving means.

The axial forces from the second actuator 5 are transmitted to the adapter 42 via a thrust bearing 46. The radial forces are transmitted via a ball bearing 54. A supporting ring 55 and a locking ring 56 absorb the axial tensile forces when the cutting tool 4 is to be moved from the cutting position shown in FIG. 6 into the non-cutting position shown in FIG. 3.

The apparatus 1 may be attached to a hand-held drill via an attachment device 6. The attachment device 6 is releasably connected to the housing 2 via a bracket arm 61. The bracket arm 61 is provided with an internal threaded portion 62 corresponding to an external third threaded portion 29 on the second end portion 24 of the housing 2. The attachment device 6 further comprises a drill bracket 63, a drill lock 65 and a locking ring 66 arranged to attach the apparatus 1 to the hand-held drill without the use of a tool.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A hand-held apparatus for hole-making in an elongated tubular body, the apparatus comprising:
    a housing with a center axis, a first end portion and a second end portion, the housing forming an external guide for a cutting tool;
    a clamping device including a first actuator which is rotatable around the center axis of the housing;
    a rotatable cutting tool arranged inside the housing and arranged to be moved axially from a non-cutting position into a cutting position, the cutting tool being rotatably connected to a second actuator via an adapter;
    the clamping device comprising two movable and lockable gripper arms, the clamping device arranged to be adjusted from a first, inactive position into a second, active position in which the clamping device is arranged to hold the apparatus fixed to the elongated tubular body; and
    a device for connecting to a driving means arranged to rotate the cutting tool.

2. The hand-held apparatus according to claim 1, wherein the first actuator comprises a thrust ring and a thrust bearing.

3. The hand-held apparatus according to claim 1, wherein the apparatus comprises a centering device arranged to position the center axis of the cutting tool perpendicularly to the center axis of the elongated tubular body when the apparatus is attached to the elongated tubular body.

4. The hand-held apparatus according to claim 3, wherein the centering device includes at least two abutment faces placed symmetrically around the center axis of the housing.

5. The hand-held apparatus according to claim 1, wherein the lockable gripper arms arranged to hold the elongated tubular body fixed against the housing.

6. The hand-held apparatus according to claim 1, wherein the clamping device comprises two movable and lockable gripper arms arranged to hold the elongated tubular body fixed against the housing.

7. The hand-held apparatus according to claim 1, wherein the gripper arm is spring-loaded.

8. The hand-held apparatus according to claim 1, wherein the second actuator comprises a screw.

9. The hand-held apparatus according to claim 1, wherein the rotatable cutting tool, in a non-cutting position, is at a distance from the elongated tubular body when the elongated tubular body is fixed in the clamping device.

10. The hand-held apparatus according to claim 1, wherein the apparatus includes a releasable attachment device for the driving means.

11. The hand-held apparatus according to claim 1, wherein the driving means consists of a drill.

12. A method of use of a hand-held apparatus, the hand-held apparatus comprising:
    a housing with a center axis, a first end portion and a second end portion, the housing forming an external guide for a cutting tool;
    a clamping device including a first actuator which is rotatable around the center axis of the housing;
    a rotatable cutting tool arranged inside the housing and arranged to be moved axially from a non-cutting position into a cutting position, the cutting tool being rotatably connected to a second actuator via an adapter;
    the clamping device comprising two movable and lockable gripper arms, the clamping device arranged to be adjusted from a first, inactive position into a second, active position in which the clamping device is arranged to hold the apparatus fixed to the elongated tubular body; and
    a device for connecting to a driving means arranged to rotate the cutting tool;
    the method comprising the steps of:
    positioning the hand-held apparatus at the elongated, tubular body;
    clamping the apparatus to the elongated tubular body by bringing the clamping device from the first, inactive position into the second, active position;
    imparting rotation to the cutting tool by activating the driving means;
    moving the cutting tool from the non-cutting position into the cutting position; and
    releasing the hand-held apparatus from the elongated tubular body by deactivating the driving means, and moving the cutting tool into its non-cutting position and the clamping device into its inactive position.

13. The method according to claim 12, wherein the hand-held apparatus comprises a second actuator, and wherein the method further comprises rotating the second actuator.

* * * * *